United States Patent
Riley et al.

(10) Patent No.: US 7,080,964 B2
(45) Date of Patent: Jul. 25, 2006

(54) TOOL CHUCK HAVING A LIGHT TRANSMITTING CAPABILITY

(75) Inventors: Jonathan G. Riley, Chicago, IL (US); Timothy Baker, Roselle, IL (US); Ernest Fischer, Skokie, IL (US)

(73) Assignee: Credo Technology Corporation, Broadview, IL (US)

( * ) Notice: Subject to any disclaimer, the term of this patent is extended or adjusted under 35 U.S.C. 154(b) by 369 days.

(21) Appl. No.: 10/648,042

(22) Filed: Aug. 26, 2003

(65) Prior Publication Data
US 2005/0047878 A1    Mar. 3, 2005

(51) Int. Cl.
*B23B 45/00* (2006.01)

(52) U.S. Cl. ............... 408/16; 279/55; 279/142; 362/119

(58) Field of Classification Search ............ 362/119, 362/120, 253, 800; 408/16, 124; 279/55, 279/56, 57, 58, 59, 158, 142, 147, 150; 409/182
See application file for complete search history.

(56) References Cited

U.S. PATENT DOCUMENTS

| | | | |
|---|---|---|---|
| 1,379,658 A | | 5/1921 | Tait et al. |
| 2,544,088 A | | 3/1951 | Hollis |
| 2,773,974 A | * | 12/1956 | Markett .............. 362/120 |
| 2,822,177 A | * | 2/1958 | Tripp .................. 279/58 |
| 2,855,679 A | * | 10/1958 | Gibble ................. 33/286 |
| 3,603,782 A | * | 9/1971 | Wortmann ............ 362/120 |
| 4,078,869 A | * | 3/1978 | Honeycutt ............. 408/16 |
| 4,844,488 A | * | 7/1989 | Flynn ................. 279/147 |
| 5,267,129 A | * | 11/1993 | Anderson .............. 362/96 |
| 5,473,519 A | | 12/1995 | McCallops et al. |
| 5,525,842 A | * | 6/1996 | Leininger .............. 290/54 |
| 5,982,059 A | | 11/1999 | Anderson |
| 6,318,874 B1 | | 11/2001 | Matsunaga |
| 6,494,590 B1 | | 12/2002 | Paganini et al. |
| 6,641,145 B1 | * | 11/2003 | Nebe et al. ............ 279/49 |
| 6,713,905 B1 | * | 3/2004 | Hirschburger et al. ... 310/47 |
| 6,890,135 B1 | * | 5/2005 | Kopras et al. ......... 409/182 |
| 2002/0172035 A1 | | 11/2002 | Hara et al. |

FOREIGN PATENT DOCUMENTS

| | | | |
|---|---|---|---|
| DE | 2362550 A1 | * | 6/1975 |
| DE | 3003703 A1 | * | 8/1980 |
| DE | 3831344 A1 | * | 3/1990 |
| DE | 101 09 490 | | 9/2002 |

(Continued)

*Primary Examiner*—Daniel W. Howell
(74) *Attorney, Agent, or Firm*—Greer, Burns & Crain, Ltd.

(57) ABSTRACT

A preferred embodiment of the invention comprises a tool chuck for a power hand tool of the type which has a generally cylindrical elongated housing with a motor contained within the housing or case and the motor having an output shaft that extends from the nose end of the hand tool, and which has one or more light producing devices located at its nose end for illuminating the work area during operation. The preferred embodiment of the tool chuck has an annular cylindrical light transmitting portion on the outside of the chuck body portion for transmitting light toward a tool bit held by the tool chuck. The preferred embodiment may have an inwardly oriented front end surface to direct the transmitted light toward the axis of the tool bit and may have an outer layer of resilient material to facilitate easy gripping of the tool chuck to tighten or loosen a tool bit.

17 Claims, 1 Drawing Sheet

FOREIGN PATENT DOCUMENTS

| | | |
|---|---|---|
| DE | 202 15 382 | 3/2003 |
| EP | 0 255 661 | 2/1988 |
| FR | 906 729 | 1/1946 |
| JP | 06 246645 | 9/1994 |

* cited by examiner

TOOL CHUCK HAVING A LIGHT TRANSMITTING CAPABILITY

The present invention generally relates to power hand tools and more particularly to a tool chuck for the same.

Small rotary hand tools that have a generally cylindrical housing or case have been marketed for many years for use in carrying out various woodworking and metal working tasks by hobbyists as well as commercial artisans. Such rotary hand tools generally have a motor unit with a rotary output shaft extending from the nose end and often have a nose portion that is configured to connect to various accessories or attachments. Some of these rotary hand tools are somewhat larger and more powerful and are known in the building trade as spiral saws that use a side cutting bit to penetrate and to rapidly cut holes for electrical outlets, light fixtures and switches and the like in dry wall. Because these tools are quite powerful even though they are relatively small, they are convenient to use on a jobsite or just about anywhere else where a source of AC power is available.

Because such power hand tools can be used to perform many tasks, some of which may be in locations where the ambient light is not particularly good, a recent development has involved placement of lights at the nose end of the hand tool which are illuminated by means of an onboard generating system, typically in the form of a magnet being located on the output shaft that creates a magnetic field that is induced into an inductive coil or inductor which generates a current that is used to illuminate a light producing device. While many types of light producing devices can be used, solid-state light emitting diodes (LEDs) are preferred because they are not prone to being easily damaged and do emit sufficient amounts of light to illuminate the work area without consuming an appreciable amount of power.

The nose portion of the hand tool may preferably have a cylindrical shape on which various attachments may be mounted, it may be desirable to have light producing devices in the nose portion close to the work area when the tool is used with a small cutting bit for example. In that type of operation, it is necessary to use a tool chuck to hold the cutting bit, and the chuck may partially block the light from illuminating the work area, particularly if the chuck is one that can be hand tightened which must necessarily have a larger diameter in order to effectively grip it. Accordingly, a preferred embodiment of a tool chuck embodying the present invention conveniently transmits light through the chuck and directs it toward the work area.

SUMMARY OF THE INVENTION

A preferred embodiment of the invention comprises a tool chuck for a power hand tool of the type which has a generally cylindrical elongated housing with a motor contained within the housing or case and the motor having an output shaft that extends from the nose end of the hand tool, and which has one or more light producing devices located at its nose end for illuminating the work area during operation. The preferred embodiment of the tool chuck has an annular cylindrical light transmitting portion on the outside of the chuck body portion for transmitting light toward a tool bit held by the tool chuck. The preferred embodiment may have an inwardly oriented front end surface to direct the transmitted light toward the axis of the tool bit and may have an outer layer of resilient material to facilitate easy gripping of the tool chuck to tighten or loosen a tool bit

DESCRIPTION OF THE PREFERRED EMBODIMENT

Figure 1:
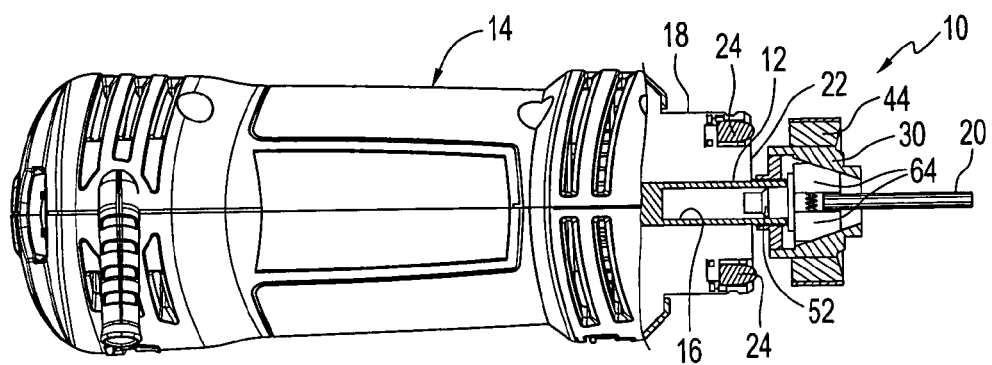
FIG. 1 is a side view of the preferred embodiment of the tool chuck of the present invention shown together with the nose portion of a power hand tool having portions removed and simplified to illustrate the light generating devices, and with the tool chuck shown partially in cross section.
Figure 2:
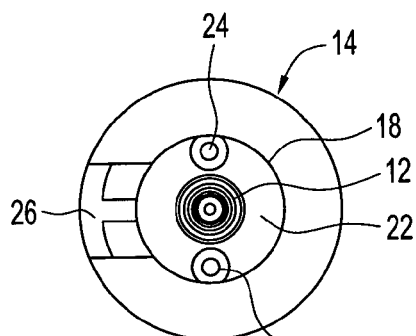
FIG. 2 is a front plan view of the power hand tool shown in FIG. 1, but without the tool chuck being illustrated.
Figure 4:
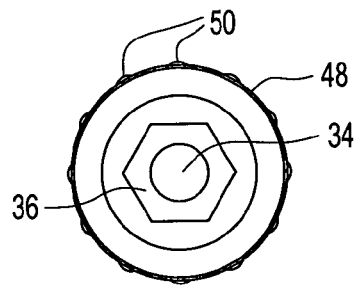
FIG. 4 is an end view of the tool chuck shown in FIG. 1.
Figure 3:
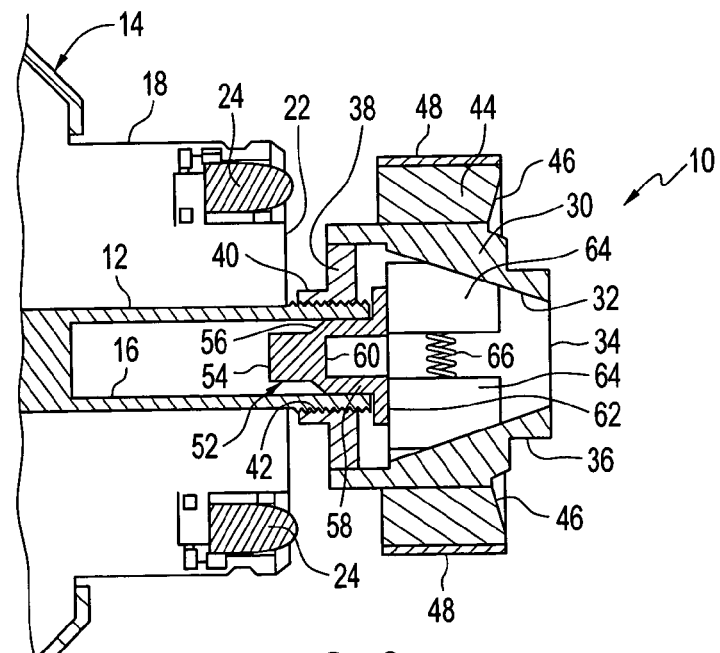
FIG. 3 is an enlarged side view of the tool chuck shown in FIG. 1, shown together with the power hand tool as shown in FIG. 1, and the tool chuck shown partially in section.

The preferred embodiment of the tool chuck indicated generally at 10 is designed to fit on an output shaft 12 of a rotary power hand tool, indicated generally at 14, that has a generally cylindrical shape as illustrated in FIG. 1. However, it should be understood that the tool chuck is suitable for use with other tools, such as power drills, routers and the like which require a mechanism for holding the shank of a bit or other tool. Because of its unique properties, it is best suited to be used with a power hand tool that has light generating devices located on board which illuminate the work area of the tool bit that is being held by the tool chuck. The power hand tool 14 has a motor (not shown) that drives the output shaft 12 that is shown to have a hollow interior portion 16 with the outside of at least the outer end being threaded for engaging interior threaded portion of the chuck 10. The hand tool 14 has a generally cylindrically shaped nose portion 18 which is configured to engage attachments and accessories that are used with the hand tool 14, such as, for example, an adjustable depth guide that extends beyond the chuck and limits the depth of cut of a tool bit 20 or a right angle attachment that may have a saw blade or grinding wheel attached to it. The nose portion 18 has an annular front surface 22 in which a pair of light producing devices 24 are located as best shown in FIGS. 1 and 2 and are preferably light emitting diodes because they are small, reliable, rugged and do not consume an appreciable amount of power during operation. While the type of light producing devices 24 and their manner of operation is not part of the present invention, the LED's may be driven by a magnet attached to the output shaft which creates flux lines that induce a current in an inductor which are connected to the LED's 24. As best shown in FIGS. 1 and 3, the location of the LED's 24 is conveniently in the front face 22 which comprises a generally flat annular ring and there is no other desirable location in which to place the LED's if they are to be integral with the housing, with the LED locations, it is apparent that the chuck 10 would block the light being emitted in the direction parallel to the shaft 12 and any bit 20. While tool chucks can be made that would have a smaller outside diameter, it is very desirable to be able to install a bit 20 and remove it without the use of external tools. If the chuck is to be used without tools, it must necessarily have a larger outer diameter that will enable a user to conveniently grip the tool chuck to tighten or loosen the same. It should be understood that rotary hand tools such as the tool 14 typically have a locking lever 26 shown in FIG. 2 which can be moved radially inwardly toward the output shaft and engage an opening in it to hold the shaft while the tool chuck is rotated to either install or remove a tool bit 20. To accommodate the larger size without blocking the light from the LED's 24, the preferred embodiment of the present invention has a transparent outer portion that transmits the light from the LED's to the work area of the tool bit 20. More particularly and referring to FIG. 3, the tool chuck 10 has a body portion 30 that is generally cylindrically shaped with a conically shaped inner chamber 32, a tool opening 34 and an outer hex-shaped configuration 36 which enables a wrench to be used in the event that the user cannot loosen the tool chuck with his hands or wishes to tighten it tighter than he can by hand. The body portion 30 has a rear cylindrical base portion 38 with a transverse extension 40 defining a base opening 42 that is threaded to engage the outer threads of the output shaft 12. An annular cylindrical light transmitting portion 44 is attached to the outer surface of the body portion 30 and it has a front annular surface 46 that is angled inwardly as shown for the purpose of redirecting light toward the axis of the output shaft 12 or toward the tool bit 20 as shown in FIG. 1, using the principles of internal reflection, which is sometimes also known as internal refraction. The light transmitting portion is preferably transparent, but may be translucent if it still transmits sufficient light that the work area is sufficiently illuminated. Similarly, while the surface 46 redirects the light inwardly, such an angled surface may not be required depending upon the placement of the LED's 24, the width of the portion 44 (width being in the radial direction). To facilitate tightening and loosening of the tool chuck 10, a relatively thin layer of rubber or rubberlike 48 material is formed on the outer surface of the light transmitting portion 44 to facilitate the user gripping the tool chuck during tightening or loosening of it. As shown in FIG. 4, the layer 48 may have a number of raised ribs 50 spaced apart from one another around the periphery of the layer to provide added gripping capability.

The interior components of the tool chuck 10 are generally conventional in that a core member, indicated generally at 52, having a reduced diameter cylindrical end portion 54, a conical segment 56, an enlarged cylindrical portion 58 with an interior chamber 60 in which the shank end of a bit 20 may be inserted and an outer cylindrical flange 62 that bears against three elongated jaws 64 of which two are shown. The jaws 64 are preferably equally spaced around the interior of the chamber 32 and are biased away from one another by compression springs 66 located between each adjacent jaw 64. The outer surface of the jaw 64 conforms to the conical shape of the chamber 32 so that when the core 52 is moved to the right, the jaws are moved to the right as well as inwardly to tighten and secure the shank of a tool bit such as tool bit 20 shown in FIG. 1. During operation, rotation of the tool chuck 10 causes the body to move axially relative to the output shaft 12 which causes the end of which engage the flange 62 of the core 52 and move it relative to the body portion 30 and similarly move the jaws 64. It should be appreciated that while the preferred embodiment has the conventional three internal jaws, the present invention can encompass other types of chucks, such as constructions which have a collet, for example.

The rotary hand tool 14 with a side cutting bit 20 is generally known in the building trades as a spiral saw which utilizes a side cutting bit 20 and is used to cut openings in drywall during construction for light fixtures, electrical outlets and switches and the like. Because it is relatively lightweight and powerful, such tools are convenient and effective to perform these cutting tasks.

The base portion 38 is preferably separately fabricated from the body portion 30 and may be press fit into the chamber 32 or otherwise firmly secured therein. It is preferred that the light transmitting portion 44 be made of polyester and the molded in situ to the body 30. In this regard, it is also preferred that the outer surface of the body portion 30 be provided with an irregular surface so that the light transmitting portion 44 will be firmly molded in place. It is also preferred that the thin layer of rubber or rubber-like material 48 be molded in place onto the light transmitting portion 44, but it is of course possible to separately make the layer 48 and secure it to the transmitting portion 44 with an adhesive, cement or the like. The preferred polyester is a copolyester marketed by Eastman Chemical Company under the tradename "Eastar" and Product No. DN010.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A tool chuck for a rotary power hand tool of the type which has an elongated generally cylindrical housing containing a motor having a motor output shaft with a hollow end portion and a threaded outer surface extending from a nose end thereof, the housing having a generally cylindrical nose end portion that is concentric with said motor output shaft, said nose end portion having at least one light emitting device that directs light generally in a direction that is parallel to the output shaft, said tool chuck comprising:

a cylindrical body portion having a concentrically aligned conically shaped chamber, the top of which communicates with a tool opening, a base portion having a threaded base opening communicating with said chamber, said base portion being threadable on the motor output shaft;

an annular cylindrical light transmitting portion attached to said body portion for transmitting light from the light emitting device of the hand tool to the area of the tool shank inserted into said tool opening, the surface of said light transmitting portion closest to the free end of the tool being angled inwardly to direct transmitted light inwardly toward the axis of said tool.

2. A tool chuck as defined in claim 1 further comprising a core positioned in said chamber and base opening, said core having a stem portion configured to extend into the hollow end portion of the motor output shaft, said core having an annular flange configured to contact the end surface of said output shaft;

a plurality of elongated jaws positioned in said chamber and configured to be moved inwardly to contact and hold a tool shank inserted into said tool opening as said core is moved toward said tool opening when said base portion is threaded onto the motor output shaft.

3. A tool chuck as defined in claim 1 wherein said light transmitting portion is a transparent material.

4. A tool chuck as defined in claim 3 wherein said transparent material is polyester.

5. Apparatus for use with a rotary power hand tool of the type which has an elongated generally cylindrical housing containing a motor having a motor output shaft with a hollow end portion and a threaded outer surface extending from a nose end thereof, the housing having a generally cylindrical nose end portion that is concentric with said motor output shaft, said nose end portion having at least one light emitting device that directs light generally in a direction that is parallel to the output shaft, said apparatus comprising:

a tool chuck configured to be attached to the motor output shaft and being rotatable thereon to selectively tighten and loosen a tool shank placed in the chuck;

an annular cylindrical light transmitting portion attached to said chuck for transmitting light from the light emitting device of the hand tool to the area of the tool shank inserted into said tool opening, the surface of said light transmitting portion closest to the free end of the tool being angled inwardly to deflect transmitted light inwardly toward the axis of the output shaft.

6. A tool chuck as defined in claim 2 where said plurality of elongated jaws comprises three jaws that are generally equally spaced around the periphery of said conical chamber.

7. A tool chuck as defined in claim 2 further comprising at least one spring for biasing said jaws toward the periphery of said chamber.

8. A tool chuck as defined in claim 1 further comprising a grip material bonded to said light transmitting portion.

9. A tool chuck as defined in claim 8 wherein said grip material is a resilient rubber or rubberlike material.

10. A tool chuck as defined in claim 1 wherein said light transmitting portion has a surface configuration that is conducive to a user gripping the same to selectively thread it on and off of the motor output shaft.

11. A tool chuck as defined in claim 10 wherein said surface configuration is in the form of axially oriented raised ribs spaced from one another around the periphery of the light transmitting portion.

12. A tool chuck for a rotary power hand tool of the type which has an elongated generally cylindrical housing containing a motor having a motor output shaft with a hollow end portion and a threaded outer surface extending from a nose end thereof, the housing having a generally cylindrical nose end portion that is concentric with said motor output shaft, said nose end portion having at least one light emitting device that directs light generally in a direction that is parallel to the output shaft, said tool chuck comprising:

a cylindrical body portion having a concentrically aligned conically shaped chamber, the top of which communicates with a tool opening, a base portion having a threaded base opening communicating with said chamber, said base portion being threadable on the motor output shaft, said body portion having a raised hex head portion adjacent said tool opening; and an annular cylindrical light transmitting portion attached to said body portion for transmitting light from the light emitting device of the hand tool to the area of the tool shank inserted into said tool opening.

13. A tool chuck as defined in claim 1 wherein the hand tool has two light emitting devices located on opposite sides of the output shaft, spaced apart from one another approximately the same distance as the diameter of said light transmitting portion of said tool chuck.

14. Apparatus as defined in claim 5 further comprising a grip material bonded to said light transmitting portion.

15. Apparatus as defined in claim 5 wherein said light transmitting portion is a transparent material.

16. Apparatus as defined in claim 15 wherein said transparent material is polyester.

17. Apparatus as defined in claim 14 wherein said grip material is a resilient rubber or rubberlike material.

* * * * *